United States Patent [19]

Burkholder

[11] Patent Number: 4,576,403
[45] Date of Patent: Mar. 18, 1986

[54] PRESSURE FITTING

[76] Inventor: Jack Burkholder, Rte. 2, Box 170AA, Eastland, Tex. 76448

[21] Appl. No.: 698,083

[22] Filed: Feb. 4, 1985

Related U.S. Application Data

[63] Continuation of Ser. No. 446,462, Dec. 3, 1982, abandoned.

[51] Int. Cl.⁴ .................................................. F16L 55/00
[52] U.S. Cl. ........................................ 285/39; 285/404; 285/374; 285/415; 29/256
[58] Field of Search ............... 285/39, 308, 404, 337, 285/321, 367, 374; 277/9.5; 29/256, 263

[56] References Cited

U.S. PATENT DOCUMENTS

| | | | |
|---|---|---|---|
| 2,944,840 | 7/1960 | Wiltse | 285/321 X |
| 2,973,977 | 3/1961 | Stovall | 285/337 |
| 3,284,561 | 11/1966 | Clements | 285/404 X |
| 4,191,384 | 3/1980 | Svedberg | 285/308 X |
| 4,274,189 | 6/1981 | Conover | 29/256 |
| 4,287,653 | 9/1981 | Bloch | 29/256 |
| 4,304,424 | 12/1981 | Hansen | 285/404 X |
| 4,397,485 | 8/1983 | Wood | 285/404 X |
| 4,417,754 | 11/1983 | Yamaji et al. | 285/404 X |

FOREIGN PATENT DOCUMENTS

| | | | |
|---|---|---|---|
| 2432771 | 3/1975 | Fed. Rep. of Germany | 285/367 |
| 1560 | of 1867 | United Kingdom | 285/18 |

Primary Examiner—Richard J. Scanlan, Jr.
Attorney, Agent, or Firm—Head, Johnson & Stevenson

[57] ABSTRACT

A push one fitting for pipe joints and comprising a bell having a central bore adapted to receive one end of the pipe joint therein, a sealing member interposed between the outer periphery of the pipe joint and the inner periphery of the bell, and clamping apparatus cooperating directly with the bell for securing the bell in position on the pipe joint, the clamping apparatus being in the form of set screws extending through the sidewall of the bell for engagement with the pipe, or a split ring having a hook-shaped flange for engagement with a complementary groove on the outer periphery of the bell.

1 Claim, 7 Drawing Figures

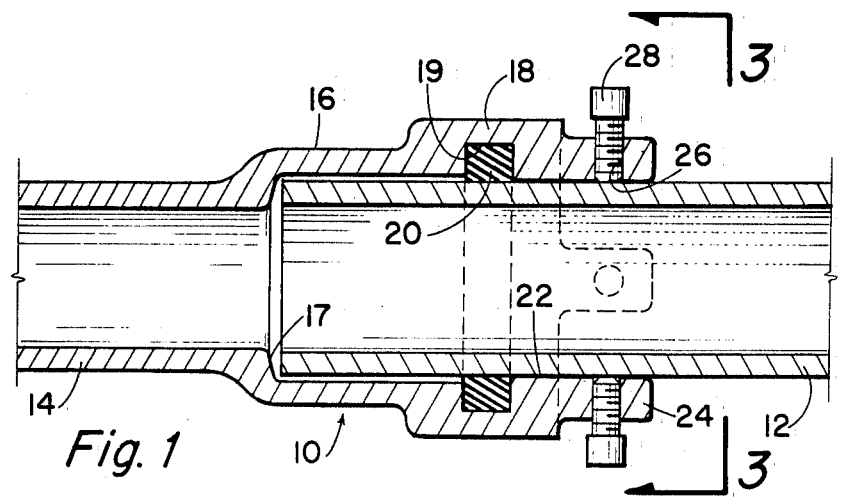
Fig. 1
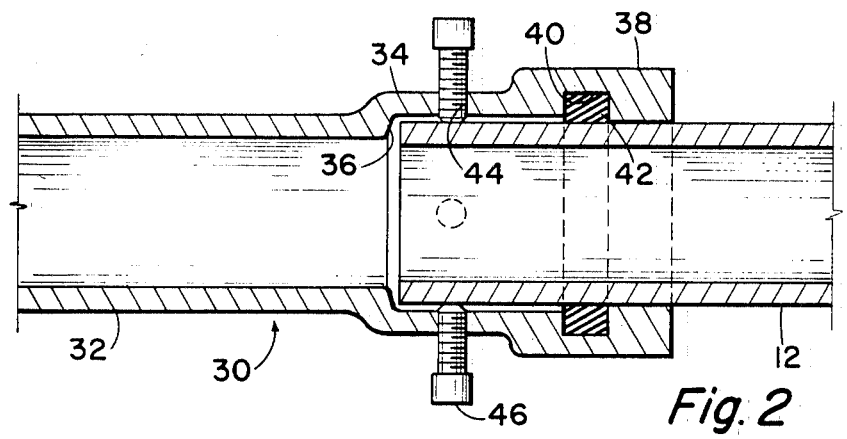
Fig. 2
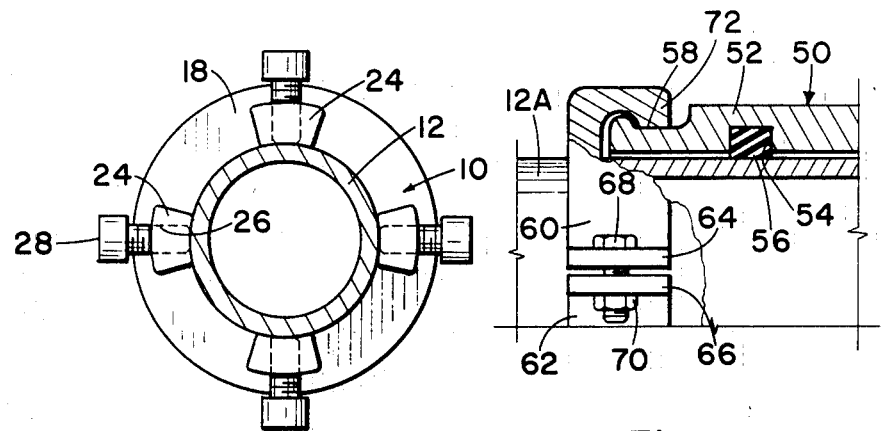
Fig. 3
Fig. 4

PRESSURE FITTING

This is a continuation of application Ser. No. 446,462, filed Dec. 3, 1982, now abandoned.

BACKGROUND OF THE INVENTION

1. Field of the Invention

This invention relates to improvements in pipe fittings and more particularly, but not by way of limitation, to pressure fittings for pipe sections.

2. Description of the Prior Art

Pipe sections are frequently secured in end-to-end or in tandem relation by means of push-on pipe bell or fitting bell elements which do not require the use of a threaded connection between the fitting and the end of the pipe section or pipe joint. One of the most common methods of securing these push-on pipe bells to the associated pipe section is to provide an ouwardly extending circumferential flange on the fitting for securing a separating ring member thereto, the ring member being provided with a plurality of circumferentially spaced set screws adapted to be engaged with the outer periphery of the pipe. This arrangement requires the initial installation of the ring on the outer periphery of the pipe prior to the insertion of the end of the pipe into the bell fitting. The ring is then secured to the fitting by means of a plurality of bolts secured between the ring and the circumferential flange of the bell fitting and the set screws are engaged with the outer periphery of the pipe for securing the bell fitting thereto. It will be apparent that the problem of installing the bell fitting on the pipe becomes time consuming and expensive.

SUMMARY OF THE INVENTION

The present invention contemplates a novel pipe fitting or push on bell for pipe sections which has been particularly designed and constructed for overcoming the foregoing disadvantages. The novel pipe joint fitting having one end open for slidably receiving the end of a pipe section therein. Axially extending lugs or an axially extending sleeve portion is provided on the fitting and is provided with a plurality of circumferentially spaced threaded apertures for receiving set screws therethrough which may be engaged with the outer periphery of the pipe section for securing the fitting in place. An internal gasket or sealing means is provided on the inner periphery of the fitting and engages the outer periphery of the pipe for precluding leakage of fluid at the joint. In the event the outer end of the pipe section is beveled, the pipe moves relatively easily through the gasket and into the seating position for the pipe with respect to the fitting. However, if the outer end of the pipe section is not beveled, but is a square end, it may be desirable to interpose a tool between the inner periphery of the fitting and the outer periphery of the pipe for facilitating the movement of the pipe through the gasket without damage to the gasket. This tool comprises a split sleeve having suitable means provided thereof for removal therefrom subsequent to the seating of the pipe section within the fitting. In the case of pipe sections constructed from PVC, a modified fitting is provided which eliminates the use of set screws which might damage the wall of the pipe. In this embodiment, the fitting is provided with an annular recess or groove extending circumferentially around the outer periphery thereof for cooperation with a split ring assembly which encircles the outer periphery of the pipe section adjacent one end of the fitting and engages the recess for securing the fitting on the pipe in a sealing engagement therewith. The novel pipe fitting is simple and efficient in operation and economical and durable in construction.

BRIEF DESCRIPTION OF THE DRAWINGS

FIG. 1 is a sectional elevational view of a pipe fitting embodying the invention and installed on the end of a pipe section.

FIG. 2 is a sectional elevational view of a modified pipe fitting embodying the invention and installed on the end of a pipe section.

FIG. 3 is a view taken on line 3—3 of FIG. 1.

FIG. 4 is a broken sectional view of a further modified pipe fitting embodying the invention as installed on the end of a pipe section.

DETAILED DESCRIPTION OF THE PREFERRED EMBODIMENT

Figure 5:
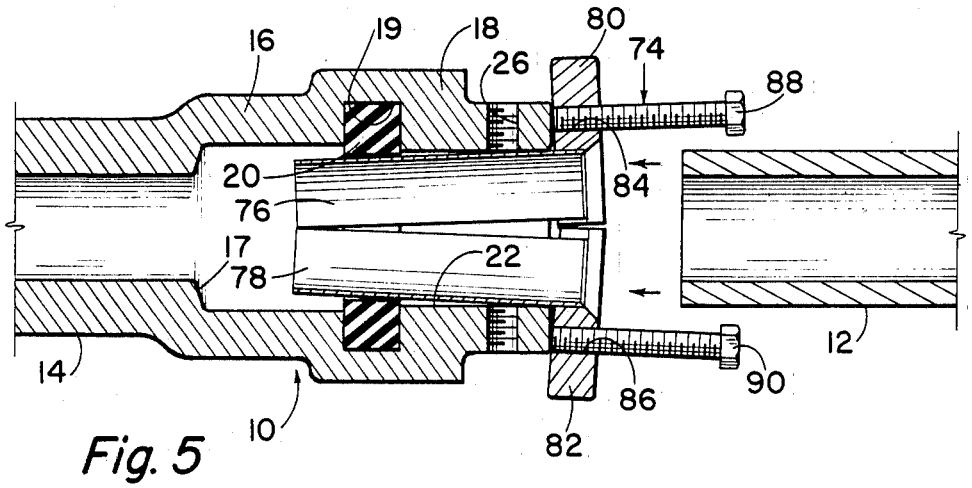
FIG. 5 is a sectional elevational view of a pipe fitting embodying the invention and a helper tool utilized therewith, and illustrates an initial step in the installation of the fitting on the end of a pipe section.

Referring to the drawings in detail, and particularly FIGS. 1 and 3, reference character 10 generally indicates a pipe fitting adapted to receive an end of a pipe joint or section 12 therein, as is well known. The fitting shown herein is of the straight through type, but it is to be understood that substantially any type fitting, such as reducing tees, branch tees, bullhead, flange fittings, or the like, may be utilized in the practice of the invention. The fitting 10 comprises a cylindrical body or sleeve 14 having a bell member 16 integral therewith or secured to one end thereof for receiving the pipe 12 therein. The inner diameter of the sleeve 14 is preferably substantially equal to the inner diameter of the pipe 12, but not limited thereto, and the inner diameter of the bell 16 is preferably slightly larger than the outer diameter of the pipe 12 for facilitating insertion of the pipe 12 therein, as is well known. An internal annular shoulder 17 is provided at the junction between the sleeve 14 and bell 16. The outer diameter of the bell 16 is preferably enlarged at 18 and an annular recess or groove 19 is provided around the inner periphery of the enlarged portion 18 for receiving a suitable sealing gasket 20 therein.

The inner diameter of the bell 16 is preferably reduced outboard of the groove 19 as particularly shown at 22, and a plurality of circumferentially spaced lugs 24 extend axially outwardly from the enlarged portion 18. Each lug 24 is provided with a threaded bore 26 extending radially or transversely therethrough for receiving suitable set screws 28 therein. It is to be noted that an axially outwardly extending sleeve (not shown) may be provided in lieu of the spaced lug member 24, if desired, with the sleeve being provided with a plurality of circumferentially spaced threaded bores for receiving the set screws 28 therein.

In order to install the fitting 10 on one end of the pipe 12, the bell portion 16 may be moved axially over the outer end of the pipe, or alternatively, the pipe section may be inserted into the bell 16. If the outer end of the pipe section 12 is beveled (not shown), the pipe moves easily through the inner diameter of the gasket 20, and may be seated against or in the proximity of the shoulder 17, as particularly shown in FIG. 1. When the pipe 12 has thus been seated within the bell 16, the set screws 28 may be tightened against the outer periphery of the pipe 12, thus securely retaining the fitting 10 in position thereon. The gasket 20 substantially precludes leakage of fluid between the pipe 12 and fitting 10, as is well known.

Referring now to FIG. 2, a modified fitting is generally indicated at 30 and comprises a cylindrical body or sleeve 32 having a bell 34 at one end thereof open at one end for receiving the pipe 12 therein as hereinbefore set forth. The inner diameter of the sleeve 32 is preferably equal to or larger than the inner diameter of the pipe 12, but not limited thereto, and the inner diameter of the bell 34 is preferably larger than the outer diameter of the pipe 12 for facilitating insertion of the pipe therein. An inner annular shoulder 34 is provided at the juncture between the sleeve 32 and bell 34. The bell 34 is provided with an enlarged outer diameter portion 36 in the proximity of the open end thereof and an annular recess or groove 40 is provided in the enlarged diameter portion 38 for receiving a sealing gasket 42 therein. The inner diameter of the enlarged portion 38 is preferably reduced outboard of the groove 40, but not limited thereto. A plurality of circumferentially spaced threaded bores 44 are provided in the sidewall of the bell 34 inboard of the enlarged portion 38, each bore 44 receiving a suitable set screw 46 therein.

The fitting 30 may be installed on the pipe 12 in the same general manner as hereinbefore set forth. Here again, if the outer end of the pipe section 12 is beveled, as is frequently the case, the pipe 12 passes easily through the gasket 42 as the fitting 30 is installed on the pipe or as the pipe is inserted into the bell 34. When the pipe 12 has been properly seated against or in the proximity of the inner shoulder 36 the set screws 46 may be tightened for engagement with the outer periphery of the pipe, thus securely retaining the fitting 30 thereon. The sealing gasket 42 substantially precludes leakage of fluid between the pipe 12 and the fitting 30.

Referring now to FIG. 4, a still further modified fitting is generally indicated at 50 and as shown is particularly designed for use with PCV pipe 12A. The fitting comprises a bell member 52 provided at one end of a suitable cylindrical body or sleeve (not shown) generally similar to the sleeves 14 and 32. The bell 52 is open at one end for receiving the pipe 12A therein and an annular recess or groove 54 is provided on the inner periphery of the bell 52 for receiving a sealing gasket 56 therein. An annular recess or groove 58 is provided around the outer periphery of the bell 52 in the proximity of the open end thereof.

A pair of substantially identical oppositely disposed split ring members 60 and 62 are secured around the outer periphery of the pipe 12A outboard of the open end of the bell 52, and may be adjustably secured together in any suitable manner, such as by a pair of complementary radially outwardly extending flanges 64 and 66 provided at the opposite ends of each ring 60 and 62, respectively and threaded studs 68 extending therebetween and locked in place by suitable lock nuts 70. Each ring 60 and 62 is provided with an axially extending circumferential flange 72 of a substantially hook-shaped cross sectional configuration, the outer end of which is adapted to engage the recess or groove 58 of the bell 52.

In order to install the fitting 50 on the pipe 12A, the pipe 12A may be inserted into the bell 52 in the usual manner, or the bell 52 may be positioned over one open end of the pipe 12A, and when the pipe 12A is properly seated within the bell 52, as hereinbefore set forth, the rings 60 and 62 may be positioned about the outer periphery of the pipe 12A and secured therearound by the bolts or studs 68, with the hook-flange 72 being in engagement with the groove 58. The studs 68 may then be tightened for pulling the rings 60 and 62 toward one another, thus providing a gripping pressure against the outer periphery of the pipe 12A. When internal pressure is applied within the interior of the pipe 12A, the interlocking fingers 72 and 58 will substantially preclude any longitudinal movement of the pipe 12A with respect to the bell 52.

Figure 6:
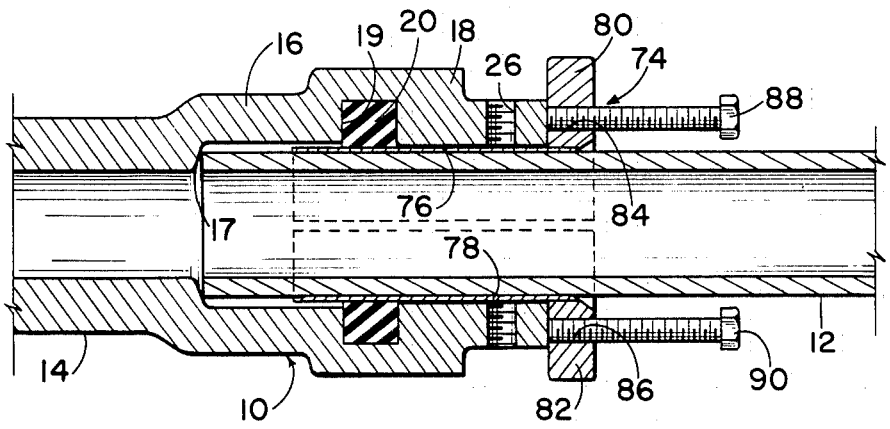
FIG. 6 is a view similar to FIG. 5 showing a next succeeding step in the installation of the fitting on the pipe section.
Figure 7:
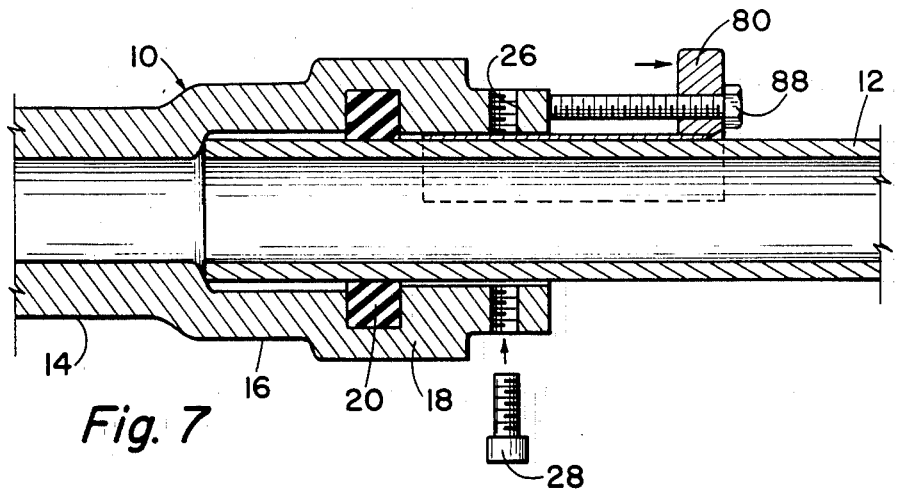
FIG. 7 is a view similar to FIGS. 5 and 6 and illustrates a still further step in the installation of a fitting embodying the invention on the end of a pipe section.

Referring now to FIGS. 5, 6 and 7, in the event the outer end of the pipe 12 which is to be inserted into the bell 16 (or the bells 34 and 52), it may be desirable to utilize a helper tool generally indicated at 74 in order to protect the sealing gasket from damage during the installation of the fittings on the pipe 12. The helper tool 74 comprises a pair of substantially identical but oppositely disposed semi-cylindrical sleeves 76 and 78, each of a size substantially corresponding to one half the circumference of the outer periphery of the pipe 12. In this manner, the two sleeves 76 and 78 may be inserted into the interior of the bell 16 and through the gasket 20 for covering the inner periphery of the gasket, as shown in FIG. 5. Each half sleeve 76 and 78 is provided with an outwardly extending circumferential flange 80 and 82, respectively, at the outer end thereof for abutting against the outer end of the bell 16 in order to limit the depth of insertion of the sleeves 76 and 78 within the bell. Each flange 80 and 82 is provided with at least one threaded bore 84 and 86, respectively, for receiving stud or bolt members 88 and 90 therein. The outer end of each stud 88 and 90 may be moved into position against the outer end of the bell 16.

With the two half-sleeves 76 and 78 thus positioned within the interior of the bell 16, the pipe 12 may then be inserted between the sleeves, or the fitting 10 moved over the outer end of the pipe. The pipe 12 may then move easily through the internal bore of the bell and through the gasket without damage thereto from the strain or unbeveled pipe end. When the pipe 12 has been properly seated within the bell 16 as shown in FIG. 6, the helper tool 74 may be removed from the position between the outer periphery of the pipe and the inner periphery of the bell.

In order to remove the tool 74 from the bell 16, the flanges 80 and 82 may be manually grasped and pulled in a longitudinal direction away from the bell 16 for dislodging of the tool therefrom, or suitable lever means (not shown) may be forced between the flanges 80 and 82 for moving the tool axially away from the bell. Alternatively, the bolts or screws 88 and 90 may be used in the manner of a jack screw by rotation of the screws in a direction for backing the flanges 80 and 82 away from engagement with the outer end of the bell 16 as particularly shown in FIG. 7. When the flanges and sleeves have been moved through a sufficient distance, the tool 74 may be easily manually removed from engagement between the pipe 12 and bell 16. When the tool 74 has been removed, the set screws 28 may be inserted into the apertures 26 for engagement with the outer periphery of the pipe as hereinbefore set forth.

From the foregoing, it will be apparent that the present invention provides a novel pipe fitting comprising a bell-type push-on fitting for slidably receiving the end of a pipe section therein. The fitting is provided with self-contained means for securing thereof to the pipe, and in the case of PVC pipe, split ring type clamp means is provided for securing the fitting to the pipe without damage to the structure of the pipe. In addition, a helper tool is provided for facilitating installation of the fitting on unbeveled pipe ends in order to prevent damage to the sealing gasket by engagement with the blunt or square end of the pipe.

Whereas the present invention has been described in particular relation to the drawings attached hereto, it should be understood that other and further modifications, apart from those shown or suggested herein may be made within the spirit and scope of this invention.

What is claimed is:

1. Pipe fitting means for connecting a pair of adjacent pipe joints in tandem relation and comprising bell means integral with one end of the pipe joint for receiving one end of the other pipe joint therein, sealing means disposed between the inner periphery of the other pipe joint, clamping means extending through the side wall of the bell means and engagable with the other pipe joint for securing the bell means on the other pipe joint, the clamping means comprising axially extending means provided at one end of the bell means, and set screw means extending through the axially extending means for engagement with the outer periphery of the pipe to secure the fitting on the pipe, and wherein the axially extending means comprises a plurality of circumferentially spaced axially extending lug means, each lug means being provided with a threaded aperture for receiving a set screw therethrough, said set screw being selectively engagable with the outer periphery of the pipe for securing the fitting to the pipe, and including helper tool means adapted for removable insertion between the bell means and the pipe for facilitating insertion of the pipe into the bell means to preclude damage of the sealing means, said helper tool means comprising a pair of substantially identical oppositely disposed semi-cylindrical sleeve members adapted to be disposed within the ball means prior to insertion of the pipe therein, and removal means provided on each semi-cylindrical sleeve member for facilitating removal of the helper tool means subsequent to the insertion of the pipe into the ball means and wherein the removal means additionally includes outwardly extending flange means provided around the outer periphery of each semi-cylindrical sleeve member and jack screw means extending longitudinally through each flange means and engagable with the outer end of the bell means for facilitating removal of the helper tool means subsequent to the insertion of the pipe into the barrel means.

* * * * *